(12) United States Patent
Quintel

(10) Patent No.: US 8,261,928 B2
(45) Date of Patent: Sep. 11, 2012

(54) SWING BOLT SPLASH SHIELD

(75) Inventor: Mark Anthony Quintel, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 239 days.

(21) Appl. No.: 12/791,923

(22) Filed: Jun. 2, 2010

(65) Prior Publication Data

US 2011/0297683 A1   Dec. 8, 2011

(51) Int. Cl.
*B65D 45/16* (2006.01)
*B61D 39/00* (2006.01)

(52) U.S. Cl. .................... 220/324; 105/377.11

(58) Field of Classification Search ............... 220/324, 220/325, 326–328; 277/514, 387; 105/377.07, 105/377.08, 377.11
See application file for complete search history.

(56) References Cited

U.S. PATENT DOCUMENTS

| | | | | |
|---|---|---|---|---|
| 2,113,776 A | | 4/1938 | Smith | |
| 2,288,312 A | * | 6/1942 | Brown | 220/203.1 |
| 3,514,009 A | * | 5/1970 | Davis et al. | 220/324 |
| 4,379,513 A | * | 4/1983 | Basterfield et al. | 220/325 |
| 4,467,936 A | | 8/1984 | Makhijani | |
| 4,809,873 A | * | 3/1989 | Fossey | 220/324 |
| 4,824,066 A | * | 4/1989 | Smith | 248/500 |
| 5,373,959 A | * | 12/1994 | Haasewinkel | 220/324 |
| 6,095,365 A | * | 8/2000 | Yielding | 220/264 |
| 6,315,147 B1 | * | 11/2001 | Bachmeier | 220/325 |
| 6,595,716 B1 | * | 7/2003 | VanDeVyvere et al. | 404/26 |
| 2006/0138144 A1 | * | 6/2006 | Montminy | 220/325 |
| 2008/0256997 A1 | | 10/2008 | Nolle et al. | |

FOREIGN PATENT DOCUMENTS

| | | |
|---|---|---|
| DE | 33 12 786 A1 | 10/1984 |
| DE | 100 04 116 A1 | 2/2001 |
| DE | 103 15 797 A1 | 11/2004 |

OTHER PUBLICATIONS

Authorized Officer Gerhard Stängl, International Search Report, Mailed Oct. 25, 2011, ISA/European Patent Office, Rijswijk, The Netherlands, 4 pages.

* cited by examiner

*Primary Examiner* — Bryon Gehman
*Assistant Examiner* — Rafael Ortiz
(74) *Attorney, Agent, or Firm* — Fay Sharpe LLP

(57) ABSTRACT

A cover is provided for a removable pressure vessel lid and the cover has a peripheral flange extending over the interface of the lid and pressure vessel to direct escaping pressurized fluid away from the operator in the event of a seal leak or residual pressure upon release of the lid fasteners. The fasteners such as swing bolts engage slots in the lid flange; and, flow shields are provided on the fasteners to redirect fluid escaping at the slots and about the fasteners.

10 Claims, 6 Drawing Sheets

SWING BOLT SPLASH SHIELD

BACKGROUND

The present disclosure relates to a safety device for controlling release of pressurized fluid from a vessel of the type having an open end with a closure removable for open access to the contents of the vessel. Pressure vessels of this type are often employed for filtering fluid through filter elements disposed within the pressure vessel and which require periodic removal for cleaning or replacement of the filter. The vessel typically contains an inlet and outlet connected in line in a fluid system for passing fluid under pressure through the filter elements contained within the vessel. Such pressure vessels commonly employ a header or closure plate disposed over an open end of the pressure vessel and secured thereto by fasteners such as bolts or toggle clamps and sealed over the end of the pressure vessel by a seal such as an O-ring or gasket.

A leak in the closure or lid seal can permit undesired release of pressurized fluid and thus create a hazard to the user. Also, in the event the vessel is not completely de-pressurized before the operator initiates release of the fasteners or clamps a residual pressurized fluid escaping between the flange and the undersurface of the cover plate as the fasteners are released can create a hazardous condition for the operator.

Thus, it has been desired to provide a way or means of reducing the hazard of escaping fluid under high pressure from a pressure vessel from a seal leak or upon depressurizing for removal of the vessel closure or lid.

BRIEF DESCRIPTION

The present disclosure provides a solution to the problem of preventing hazardous escape of fluid under high pressure from a pressure vessel during operation in the event of seal failure; and, additionally upon the operator loosening of the fasteners of the pressure vessel closure or lid for removal thereof after opening a bleed valve for access to the interior of the pressure vessel. The pressure vessel closure or lid has a flange extending peripherally thereabout and at generally right angle to the lid for directing fluid escaping between the lid and the pressure vessel in a direction generally parallel to the wall of the pressure vessel as the fasteners retaining the lid are released by the user, and thus in a direction away from the operator or user.

The closure is secured by swing bolts pivoted on the vessel wall and engaging open cutouts or slots in the closure. Flow shields are provided on the swing bolts for redirecting fluid escaping at the slots and about the bolts for protecting the user from a blast of fluid under high pressure escaping in the region of the fasteners.

DETAILED DESCRIPTION

Figure 1:
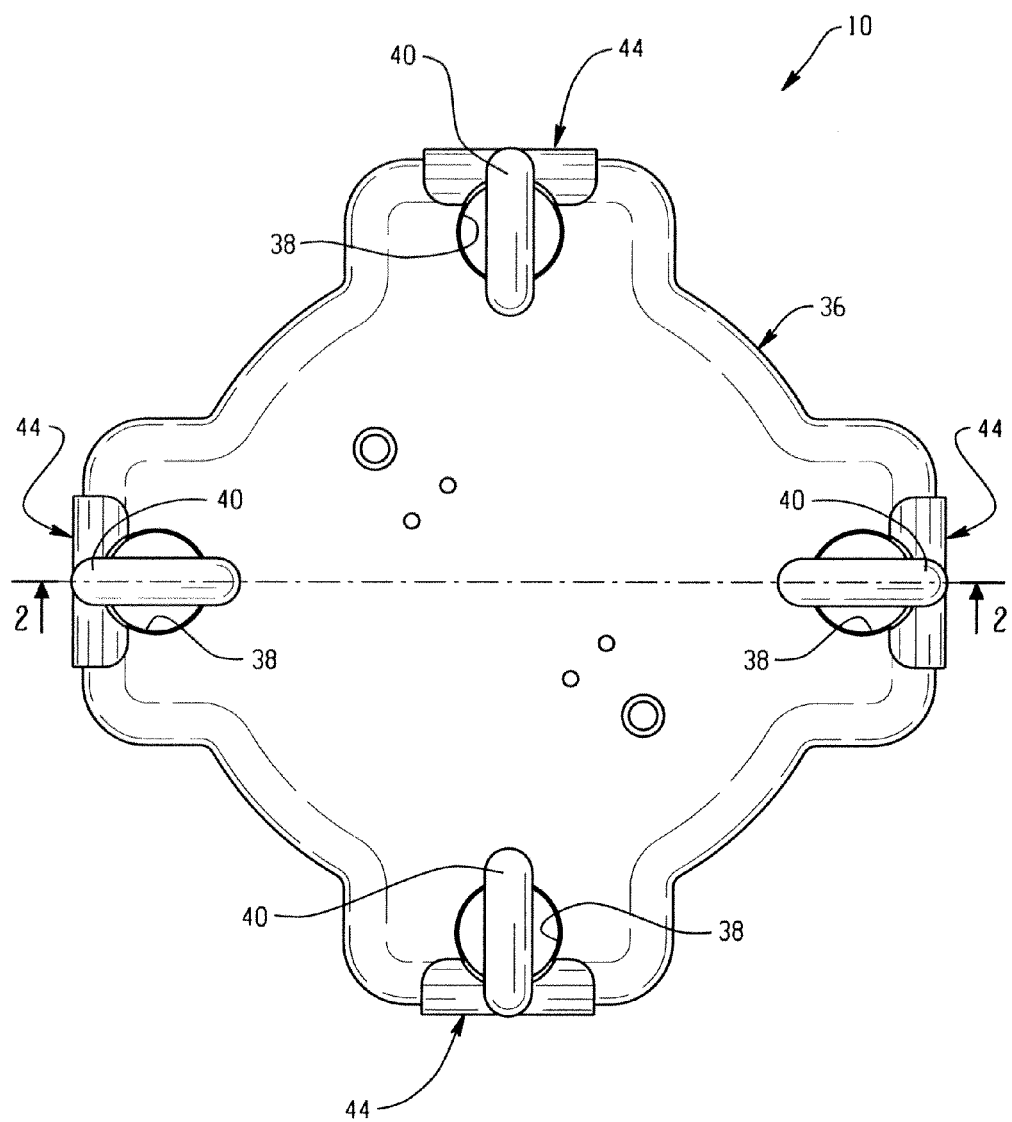
FIG. 1 is top view of the assembled pressure vessel with the lid and flow shields secured in place thereon.

Referring to FIGS. 1-4, an exemplary pressure vessel assembly in accordance with the present disclosure is indicated generally at 10 and has a relatively thin walled pressure vessel member 12. Vessel member 12 may have a generally circular transverse section and has an open end indicated generally at 14 with an annular flange 16 provided thereon, which flange has an annular groove 18 formed therein into which is received a resilient annular sealing member 20 such as an O-ring. The vessel 12 may be provided with at least one fluid line connector fitting such as denoted by reference numeral 22 in FIG. 2 for connection to a fluid pressure or flow line such as in the case where the pressure vessel is employed for containing a fluid filter (not shown). It will be understood that another unshown fluid fitting may be provided for inlet and outlet flow.

Figure 2:
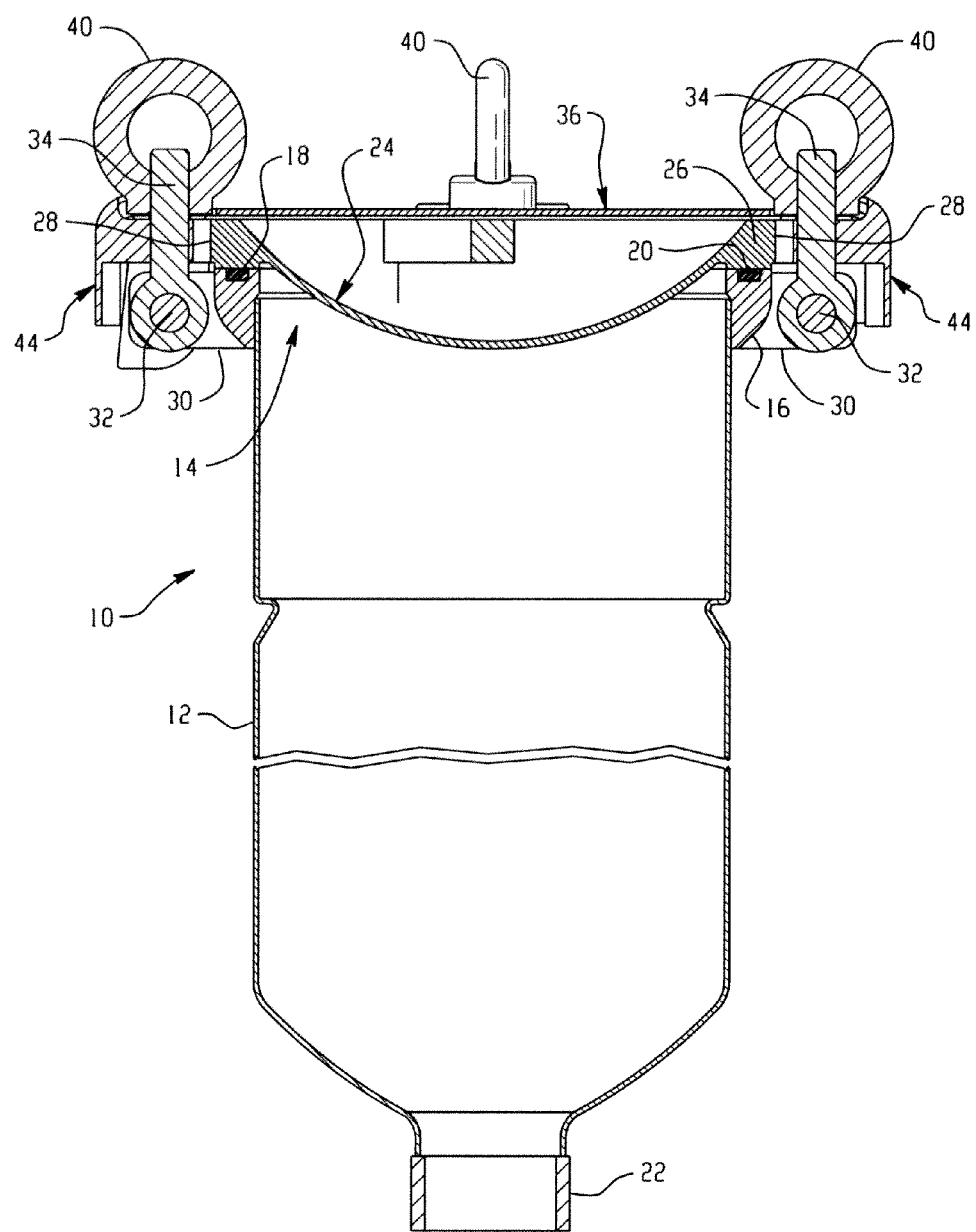
FIG. 2 is a section view taken along section indicating lines 2-2 of FIG. 1.
Figure 3:
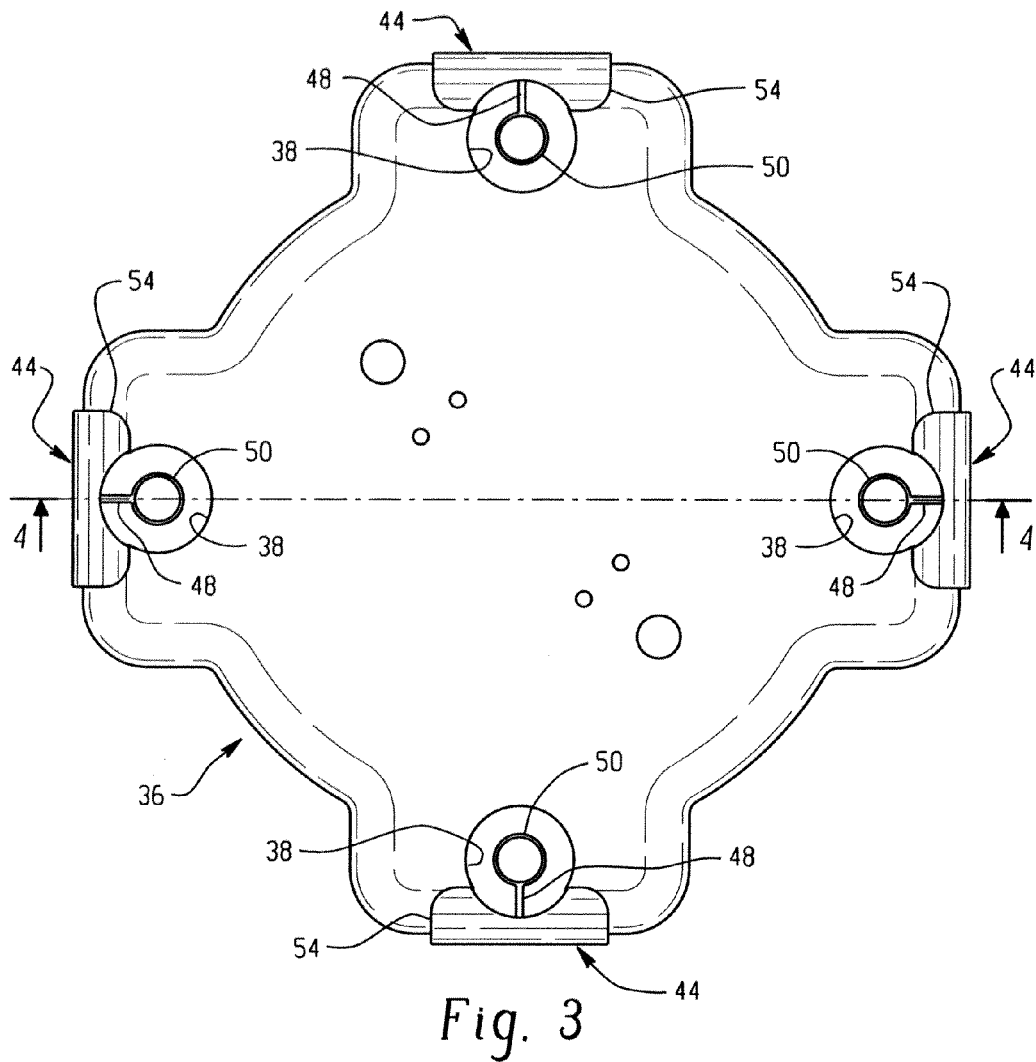
FIG. 3 is an enlarged view of the closure with the flow shields in place.
Figure 4:
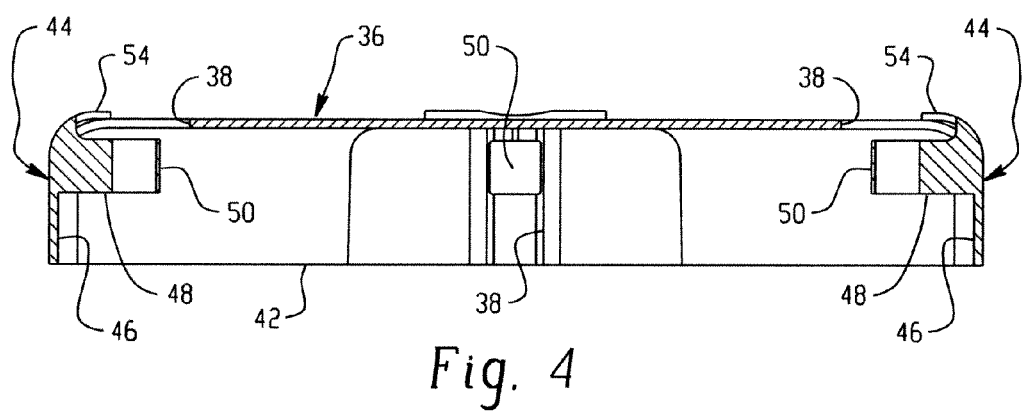
FIG. 4 is a section view taken along section indicating lines 4-4 of FIG. 3.

The pressure vessel member 12 has a lid or closure indicated generally at 24 which has in the exemplary version illustrated in FIG. 2, a generally concave central section with a relatively thick annular flange portion 26 disposed peripherally thereabout. The flange 26 has provided therein a plurality of circumferentially spaced cutouts or slots 28 for receiving fasteners as will hereinafter be described.

The pressure vessel flange 16 has a plurality of radially outwardly extending circumferentially spaced lugs 30 provided thereon which have cross pins 32 with each pin having pivotally received thereon the eye portion of a swing bolt 34 which has the threaded portion thereof extending upwardly through the slots 28 in the flange 26 of the lid 24.

A cover plate indicated generally at 36 is received over the lid 24 and has a plurality of cutouts 38 formed thereon into each of which is received one of the swing bolts 34; and, lid or closure 24 is secured to the vessel 12 by a ringed nut 40 or alternatively a castellated nut threadedly engaging each of the swing bolts 34.

Referring to FIGS. 1-8, the cover 36 has a downwardly extending flange 42 provided thereon and extending about the periphery thereof. The underside of which flange serves to deflect downwardly along the wall of vessel 12 the blast of pressurized fluid escaping between the undersurface of the cover flange 26 and the seal ring 20.

However, it will be understood that the cutouts or slots 38 formed in the cover provide an open area for the blast of pressurized fluid to escape about the swing bolts 34 and through the cutouts 38.

In order to prevent blasts of pressurized fluid escaping outwardly through slots 38 and about the swing bolts 34, fluid flow or blast shields, indicated generally at 44, are disposed about each of the slots 38 and over the swing bolts 34. Shields 44 are configured, as will hereinafter be described, to be retained by the swing bolts and to function to direct flow escaping through slots 38 and about the swing bolts in a direction downwardly and away from the user or operator.

Figure 5:
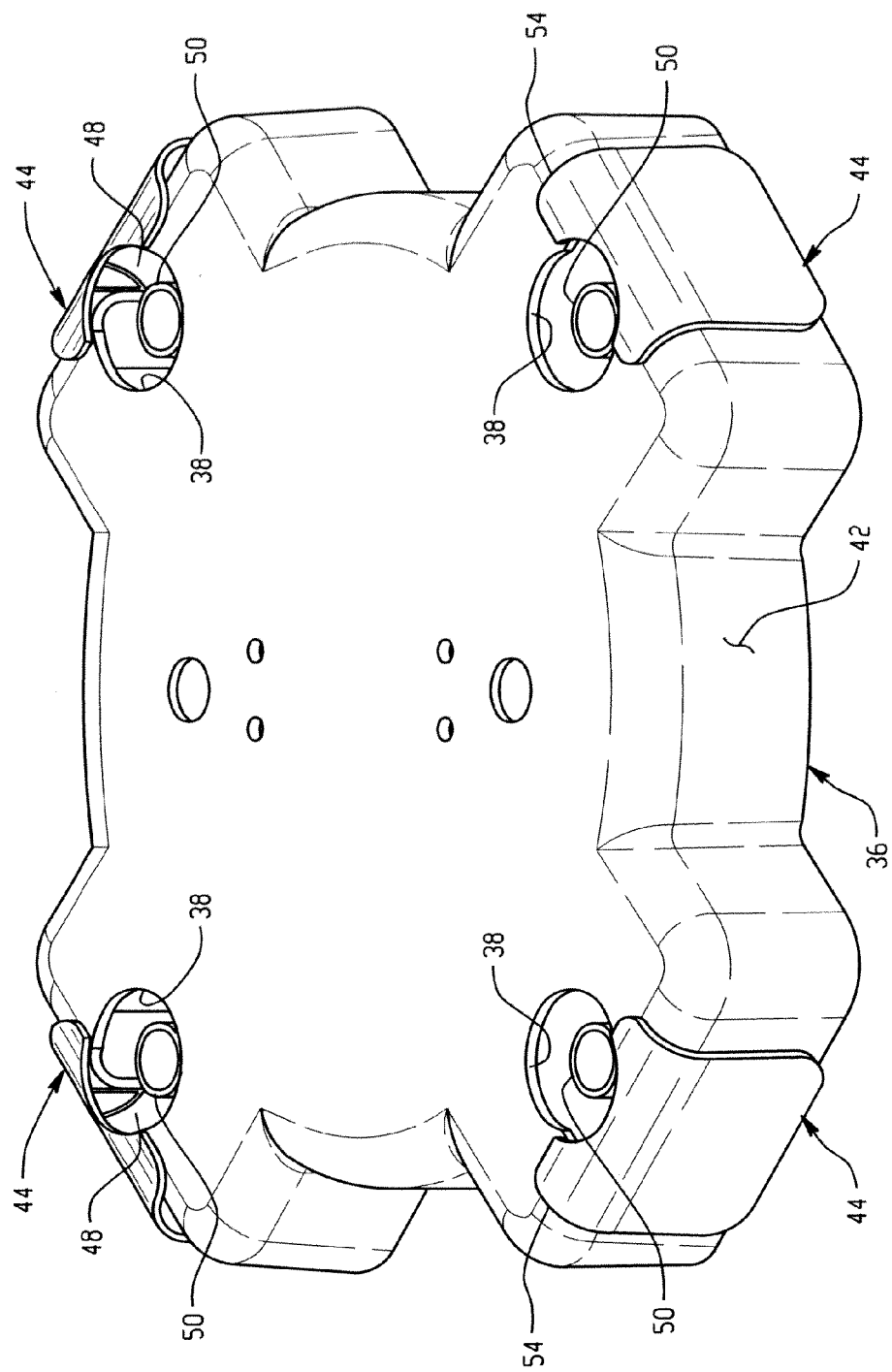
FIG. 5 is an axonometric view of the lid with the flow shields positioned thereon.

Referring particularly to FIG. 5, the cover 36 is shown with one of the blast shields 44 positioned over each of the slots 38 prior to assembly of the cover and shields over the swing bolts 34.

Figure 6:
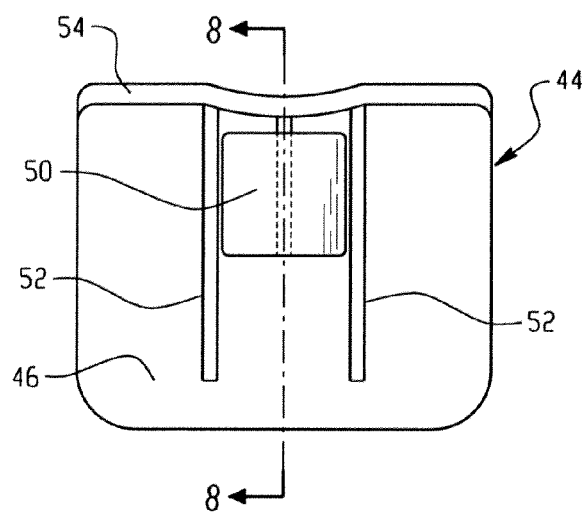
FIG. 6 is a side elevation view of the flow shield.
Figure 8:
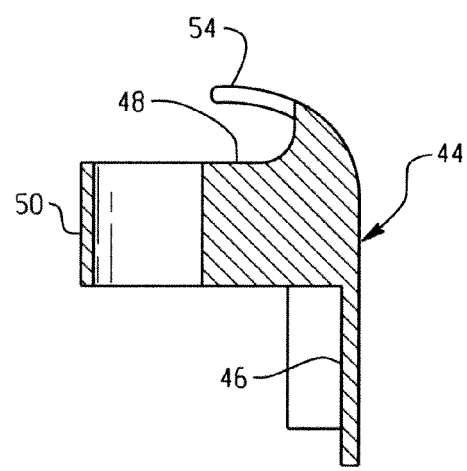
FIG. 8 is a section view taken along section indicating lines 8-8 of FIG. 6; and,
FIG. 9 is a view similar to FIG. 1 showing the swing bolts in the downward position for release of the lid.
Figure 7:
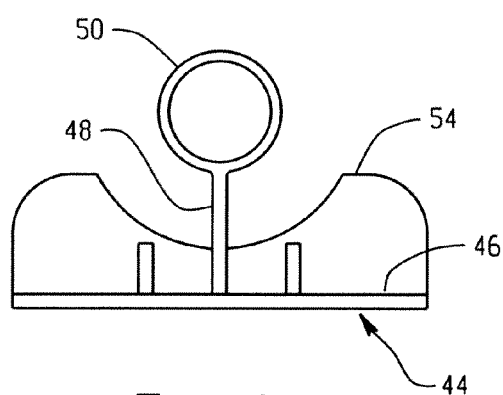
FIG. 7 is a bottom view of the shield of FIG. 6.

Referring to FIGS. 6-8, an exemplary blast shield 44 is shown as having a plate portion 46, the inner surface thereof being operable to receive and redirect in a downwardly direction high pressure flow escaping in the slots 38 and about the swing bolts 34. The plate 46 has an inwardly extending rib 48 which may be formed integrally with plate 46 or affixed thereto as for example by weldment and which has provided thereon a hollow cylindrical portion 50 which is adapted to be received over one of the swing bolts 34. In the exemplary version illustrated, the plate 46 has stiffening ribs 48 provided thereon which extend upwardly therealong to the curved radially inwardly extending flange portion 54 formed along the upper edge of the plate 46.

Thus, when positioned over the slots 38 of the cover 36 and flush against the outer surface of the cover flange 42, each of the shields 44 covers one of the cutouts or slots 38 and one of the swing bolts 34 to prevent high pressure fluid escaping through the slots upon the user loosening the ringed nuts 40.

It will be understood that upon release of the pressure in the vessel by loosening of the ringed nuts 40, the user may then pivot the swing bolts 34 outwardly of the slots 38 and downwardly to release the cover and the closure 24 for removal.

Figure 9:
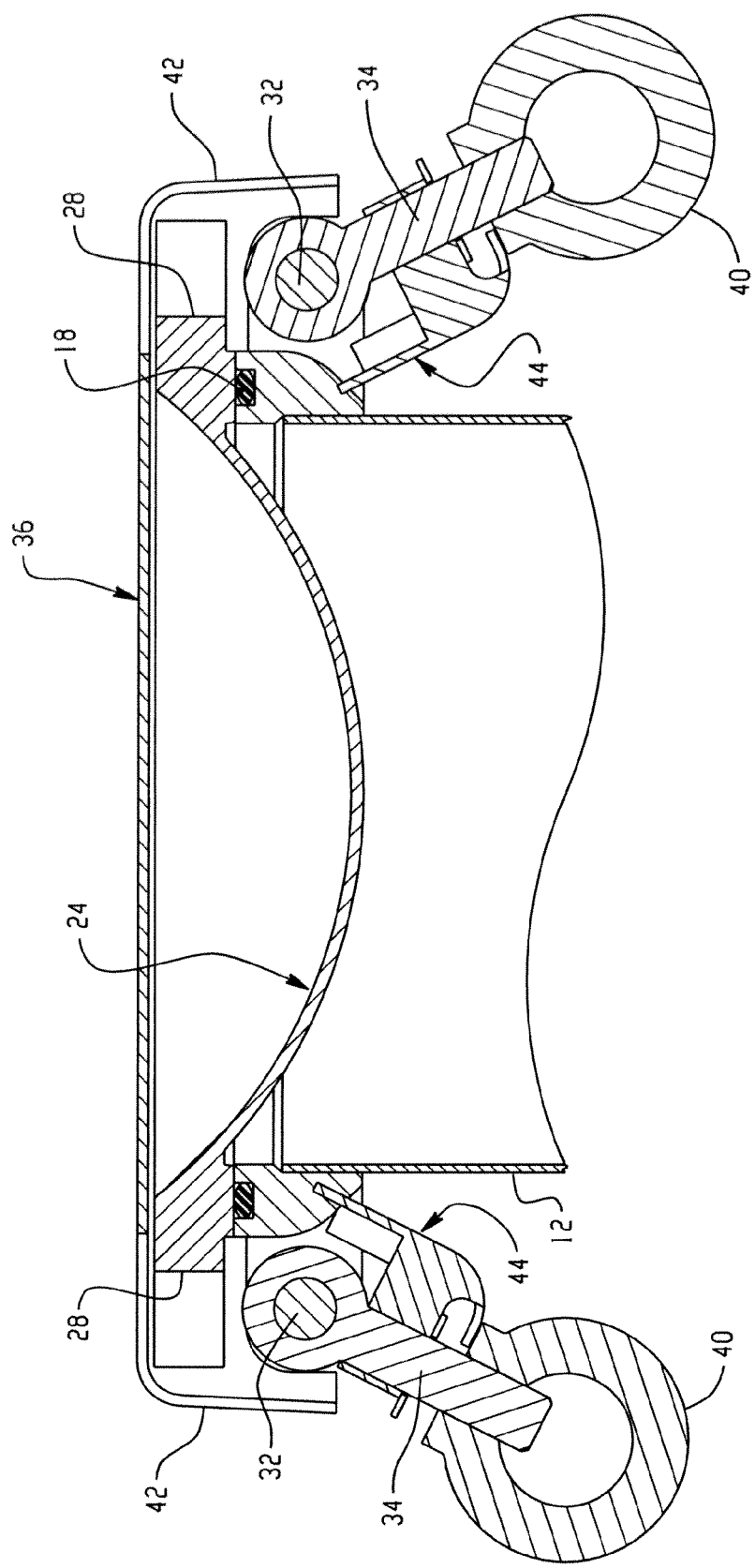

Referring to FIG. 9, swing bolts 34 are shown in the released or downward position after loosening of nuts 40 and pivoting bolts 34 about pins 32 and out of slots 28 thus releasing the closure 24 for removal. Shields 44 are rotated with bolts 34.

The present disclosure thus describes a technique for enabling the cover or lid of a pressure vessel to be retained by swing bolts for quick release and removal by the user or operator. In the event of a lid seal leak, or any residual pressure in the vessel after de-pressurization, the escape of the high pressure fluid in the region of the slots for the swing bolts is deflected by blast shields attached to the swing bolts for covering the slots in the closure or lid.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A pressure vessel with removable closure and user pressure release protection comprising:
   (a) structure defining a generally cup-shaped pressure chamber with a sealing surface disposed about the open end thereof;
   (b) a closure releasably disposed over the open end of the cup-shape;
   (c) a sealing member disposed to seal between the closure and the sealing surface;
   (d) a plurality of quick-release fasteners operable to retain the closure in position over the pressure vessel; and,
   (e) a respective removable blast shield disposed over each of said fasteners for, in the event of a seal failure, directing substantially all flow escaping about the fasteners away from a user, wherein the closure includes a flange disposed to direct escaping pressurized fluid in other portions of the closure away from the user upon release of the fasteners.

2. The pressure vessel defined in claim 1, wherein the fasteners include swing bolts engaging cut-outs in the closure.

3. The pressure vessel defined in claim 2, wherein each blast shield comprises a member received over one of said cut-outs and retained by the swing bolts.

4. The pressure vessel defined in claim 1, wherein the fasteners include eye-bolts engaging cut-outs in the periphery of the closure; and, the blast shield includes a member disposed over the closure with portions extending over a respective cut-out.

5. The pressure vessel defined in claim 1, wherein the sealing member comprises an annular seal of flexible material.

6. The pressure vessel defined in claim 1, wherein each blast shield comprises a member received over one of the fasteners and retained therewith.

7. The pressure vessel defined in claim 1, wherein the plurality of fasteners includes swing bolts and each blast shield includes a member having portions thereof received over one set swing bolt for securing the shield thereto.

8. The pressure vessel defined in claim 1, wherein the fasteners include eye bolts pivotably engaging the pressure chamber.

9. The pressure vessel defined in claim 1, wherein each blast shield comprises a one-piece member received over the closure having a portion thereof extending over one of the plurality of fasteners.

10. The pressure vessel defined in claim 9, wherein the plurality of fasteners includes swing bolts.

* * * * *